(12) United States Patent  
Cook et al.

(10) Patent No.: US 8,173,056 B2
(45) Date of Patent: May 8, 2012

(54) METHOD OF FABRICATING AN ENTITY AND CORRESPONDING DEVICE

(75) Inventors: David Cook, Gloucestershire (GB); Philippe Lencou, Ouistreham (FR)

(73) Assignee: Oberthur Technologies, Levallois-Perret (FR)

( * ) Notice: Subject to any disclaimer, the term of this patent is extended or adjusted under 35 U.S.C. 154(b) by 322 days.

(21) Appl. No.: 12/514,537

(22) PCT Filed: Nov. 13, 2007

(86) PCT No.: PCT/IB2007/004276
§ 371 (c)(1),
(2), (4) Date: May 12, 2009

(87) PCT Pub. No.: WO2008/059380
PCT Pub. Date: May 22, 2008

(65) Prior Publication Data
US 2010/0038820 A1    Feb. 18, 2010

(30) Foreign Application Priority Data

Nov. 17, 2006  (EP) ..................................... 06291782

(51) Int. Cl.
*B29C 39/10* (2006.01)
*B29C 39/22* (2006.01)
*B29C 39/24* (2006.01)
*B29C 39/36* (2006.01)

(52) U.S. Cl. ......... 264/272.14; 264/272.15; 264/272.17; 264/275; 425/127; 425/129.1; 425/588; 425/556

(58) Field of Classification Search .................. None
See application file for complete search history.

(56) References Cited

U.S. PATENT DOCUMENTS

| 5,164,144 | A | * | 11/1992 | Rose | 264/511 |
| 5,198,652 | A | * | 3/1993 | Rose | 235/492 |
| 5,682,295 | A | * | 10/1997 | Horejs et al. | 361/737 |
| 5,894,006 | A | | 4/1999 | Herbst | |
| 6,002,663 | A | * | 12/1999 | Sandstrom | 369/282 |
| 6,139,307 | A | * | 10/2000 | Plourde et al. | 425/192 R |
| 6,176,431 | B1 | | 1/2001 | Hoppe et al. | |
| 6,410,355 | B1 | * | 6/2002 | Wallace | 438/15 |
| 6,534,711 | B1 | | 3/2003 | Pollack | |
| 7,235,423 | B1 | * | 6/2007 | Wang et al. | 438/107 |
| 7,656,014 | B2 | * | 2/2010 | Tanigawa et al. | 257/679 |
| 7,719,845 | B1 | * | 5/2010 | Jang et al. | 361/737 |
| 2008/0272519 | A1 | | 11/2008 | Launay | |

FOREIGN PATENT DOCUMENTS

| EP | 0277854 | 8/1988 |
| EP | 0 745 956 | 12/1996 |
| EP | 0 756 925 | 2/1997 |
| EP | 0 935 287 | 8/1999 |
| JP | 6-120281 | 4/1994 |
| WO | 2008097096 | 8/2008 |

OTHER PUBLICATIONS

International Search Report dated May 27, 2008, from corresponding PCT application.

* cited by examiner

*Primary Examiner* — Edmund H. Lee
(74) *Attorney, Agent, or Firm* — Young & Thompson

(57) ABSTRACT

A method of fabricating an electronic entity includes the steps of: forming at least part of the entity by hardening a material (28) in a mold, and (26); personalizing the entity while in the mould (26). A corresponding device is also described.

33 Claims, 3 Drawing Sheets

METHOD OF FABRICATING AN ENTITY AND CORRESPONDING DEVICE

The invention relates to a method of fabricating an entity and to a corresponding device.

The production of electronic entities, such as microcircuit cards or other data storage devices, is conventionally divided into two distinct stages: One, a manufacturing stage comprising, for example, assembling an electronic module containing a microcircuit and inserting the module in a plastic substrate. Two, a personalisation stage that adapts the electronic entity thus produced to its specific application, for example, by creating a graphical representation on the surface of the entity, and/or by electrically storing data in a memory contained in the electronic module.

The inventors of the present invention have realized that this conventional division, based on organisational grounds, may not be optimal as regards the overall process flow—the flow from the beginning of the manufacturing process through to the end of the personalisation process, in particular, in the case of a relatively long manufacturing process, such as when hardening of the material forming the substrate of the entity is required.

In order to reduce the overall time needed to produce the electronic entity, and thus to correspondingly reduce operational costs, the invention proposes a method of fabricating an electronic entity, comprising the steps of:
  forming at least part of the entity by hardening a material in a mould;
  personalising the entity while in the mould.

The mould is thus used for both the manufacturing and personalisation steps, which reduces the complexity of the overall process. The personalised entity may then be removed from the mould.

The step of personalising occurs for instance while the material is hardening, which results in reduction of the overall time needed.

The step of personalising may also occur while the material is flowing into the mould, which is another way of reducing the overall time needed.

According to a first embodiment, the step of personalising includes forming a graphical representation on a face of the entity.

According to a second embodiment, the step of personalising includes storing data in a memory of the entity.

In this context, the personalisation step may even take place before flowing the material into the mould, for example, as a contact plate carrying the memory is secured to the mould.

Generally speaking, a contact plate of the entity may be electrically linked to the memory and connected to a personalisation equipment while the entity is in the mould.

According to a possible implementation, a contact head connected to the personalisation equipment is inserted into an opening of the mould for the purpose of contacting the contact plate. This opening may be a through-hole used for securing the contact plate to the mould.

According to another possible implementation, at least one conductor extending through the mould contacts the contact plate for the purpose of connecting to the personalisation equipment.

According to still another implementation, the step of personalisation includes exchanging said data through contactless communication between a microcircuit connected to the memory and a contactless head connected to the personalisation equipment. This step is particularly interesting for contactless electronic entities.

The mould may be an open mould, in which case a forming plate may be applied against said material in an open part of the mould. As an alternative, the step of forming includes injection moulding said part of the entity.

In the case of electrical personalisation via contactless communication and when using an open mould, the contactless head may, for example, face an open side of the mould, thus taking advantage of the specific design of the open mould.

A plurality of entities may be formed within the same mould, in which case personalisation of these various entities may be performed simultaneously.

The electronic entity may be, for example, a USB key or a microcircuit card (for example, a card that conforms to the ISO7816 standard, or a memory card, such as an MMC card).

The invention also proposes a device for fabricating an electronic entity, comprising a mould for forming at least part of the entity by hardening a material and means for personalising the entity while in the mould.

Such a device may include additional features as described above with respect to the proposed process, with corresponding advantages.

Other features and advantages of the invention will appear in the light of the following description made with reference to the appended drawings, among which:

A method for producing a microcircuit card will now be described as a first possible embodiment of the invention. As previously noted, the invention is not limited to the manufacturing of microcircuit cards, but also applies to other types of electronic entities, for example, portable data carriers, referred to as USB keys.

The microcircuit card produced in the present embodiment is a card made in accordance with the ISO7816 standard, with a thickness of about 0.76 mm.

Figure 1:
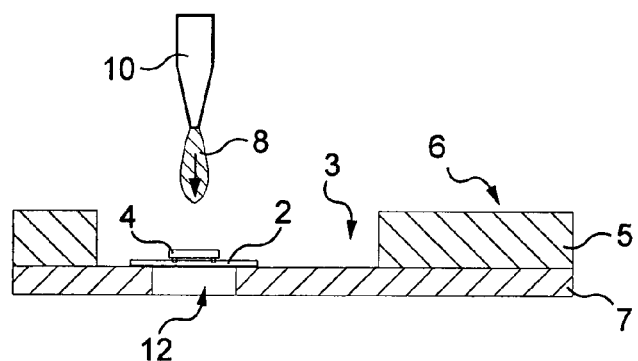
FIG. 1 shows an exemplary first step of the first embodiment of the method according to the invention.

In a first step shown in FIG. 1, an electronic module comprising a contact plate 2 and a microcircuit 4 is placed in a mould 6.

The microcircuit 4 may be a memory or a microprocessor, possibly with internal memories. The electronic module may include several microcircuits, for example, a microprocessor and an associated memory.

The contact plate 2 has a plurality of contacts on its face opposite the face where the microcircuit 4 is mounted. Each of the contacts is connected to a corresponding pad on the microcircuit 4, for example, through vias that pass through the contact plate 2.

The mould 6 comprises a base part 7 carrying a matrix 5 having a cavity 3 defining the shape of the card to be moulded. The mould used in the present embodiment is an open mould as shown in FIG. 1, i.e. the cavity of the matrix 5 is not closed at its top opposite the base part 7. The invention is not limited however to this kind of mould as will be shown below.

The base part 7 has a through-hole 12 leading into the cavity 3 of the matrix 5 at the desired location for the electric module, in order to secure the contact plate 2 to the bottom of the cavity. The contact plate may be held, for example, by reduced pressure in the through-hole 12 (for example, by means of a suction head sucking air in the through-hole) in order to maintain the contact plate 2 against the base part 7 in the bottom of the cavity 3. The contact plate 2 is secured to the bottom of the cavity 3 with its contacts facing the bottom wall and the through-hole 12.

A polyurethane resin 8 mixed with a hardener is poured into the cavity 3 of the matrix 5 by an applicator nozzle 10 (as shown in FIG. 1) in order to fill at least partly the cavity 3. The viscosity of the polyurethane-based mixture is less than 10,000 mPa·s, preferably between 500 mPa·s and 5,000 mPa·s, in order to flow and fully surround the electronic module, and to have a sufficiently flat upper surface without the need for a closed mould.

Figure 9:
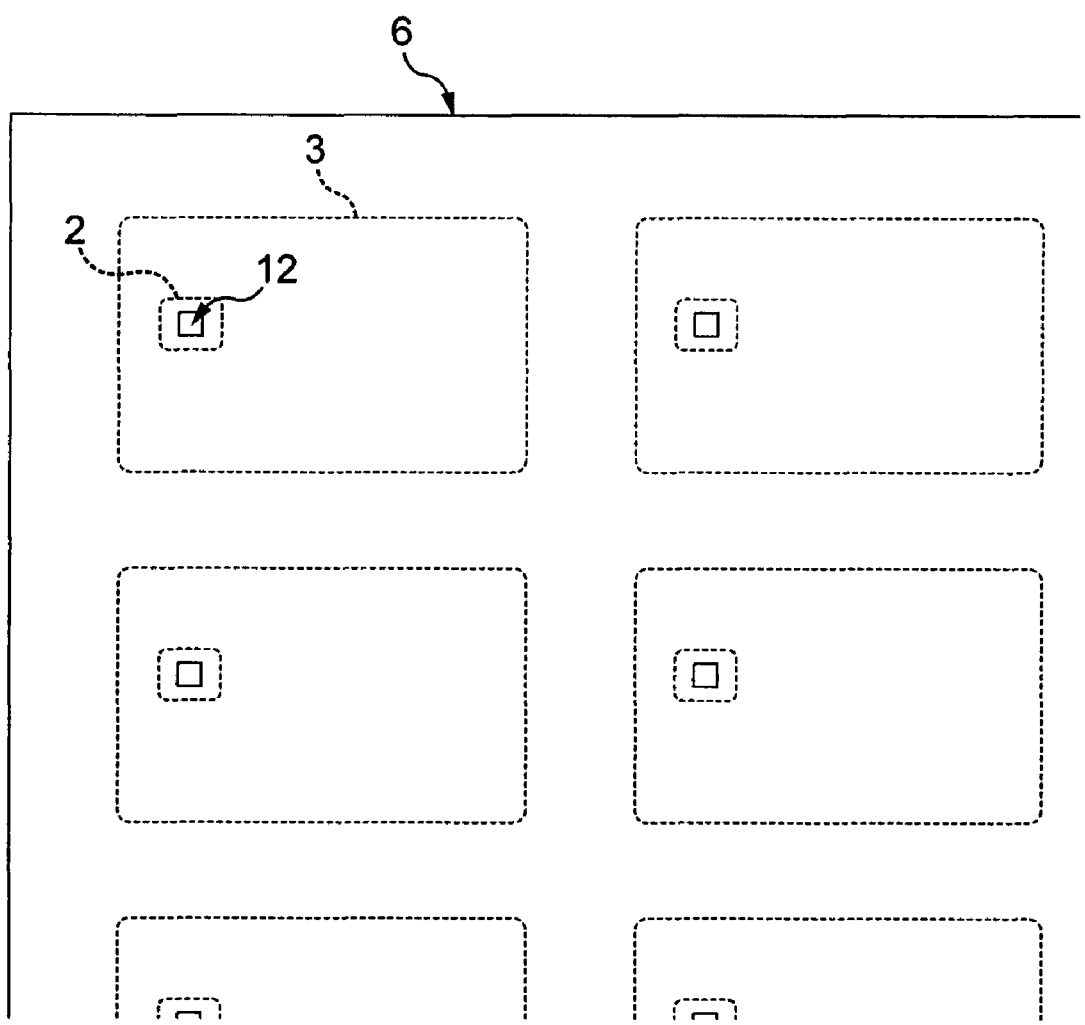
FIG. 9 shows a possible implementation providing for the production of a plurality of cards in the same mould.

As shown in FIG. 9, the mould 6 may be provided with a plurality of cavities 3 in order to simultaneously produce a plurality of microcircuit cards. The mould 6 has a plurality of through-holes 12 each corresponding to the contact plate 2 placed in each cavity.

Figure 2:
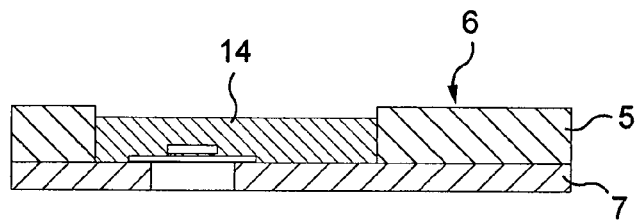
FIG. 2 shows an exemplary second step of the first embodiment.

FIG. 2 shows the resin layer 14 thus obtained while hardening. Although the hardening may take place at an ambient temperature (without heating), the hardening may be accelerated by heating (for example, to a temperature between 30° C. and 100° C.) and/or by applying UV rays to the resin layer 14.

Figure 3:
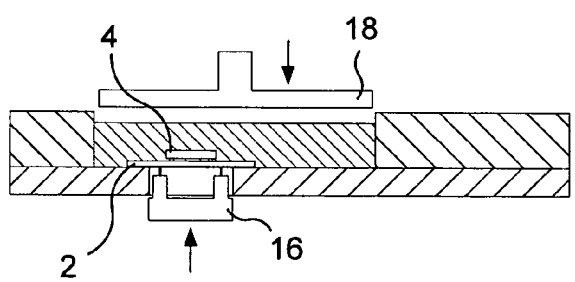
FIG. 3 shows an exemplary third step of the first embodiment.

During the final stage of hardening shown in FIG. 3 (or, as a variant, when the resin has totally hardened), a contact head 16 is engaged in the through-hole 12 and onto the contact plate 2. In this manner, each of a plurality of pins of the contact head 16 is electrically connected to a corresponding contact of the contact plate 2.

Electrical personalisation of the module (i.e. storing of personal data specific to the microcircuit card in the memory of the electronic module) can be performed using these connections (the contact head 16 being connected to an electrical personalisation equipment).

In order to minimise deformation of the card body (in particular when the personalisation step occurs during hardening), a forming plate 18 is applied to the top surface of the card (i.e. the top surface of the resin layer 14).

The personalisation of the microcircuit card while it is still within the mould 6 participates in optimising the process as the steps of moulding and personalising are both made with the mould as a frame for the card. Further, transportation of the card may be avoided, for example, when the contact head 16 is inserted in the through-hole 12 at the same location as the resin layer 14 was previously formed.

When the personalisation takes place while the resin layer 14 is still hardening, the overall production time of the card is moreover reduced, thanks to the overlap of the hardening and personalising steps.

In the case of simultaneous production of a plurality of cards, as shown in FIG. 9, the use of a multihead tool having a contact head corresponding to each through-hole 12 makes it possible to simultaneously personalise the cards in the mould. In such an implementation, data specific to each card are sent from the personalisation equipment to the contact head facing the appropriate card.

Figure 4:
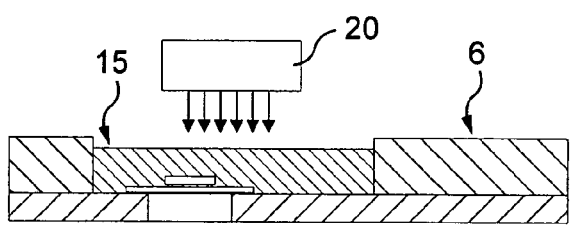
FIG. 4 shows an exemplary fourth step of the first embodiment.

FIG. 4 shows a further step of the first embodiment consisting in graphical personalisation of the top face of the card 15 (i.e. the face opposite to the face of the contacts of the electric module).

In the present embodiment, graphical personalisation is performed by inkjet printing by a graphical head 20 after full hardening of the resin has occurred. At this point, it is taken advantage of the fact that the mould 6 is open, which allows to create (i.e. to form) a graphical representation on the top face of the card while the card is still in the mould 6.

As a possible variation of the first embodiment described above, where both the electrical personalisation and the graphical personalisation are performed while the card 15 is still in the mould 5, the electrical and/or the graphical personalisation may be carried out at a later stage after the card 15 has been ejected from the mould 6.

Figure 5:
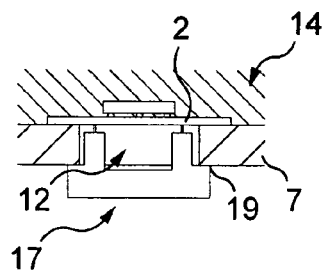
FIG. 5 shows a possible variation for the contact head of FIG. 3.

FIG. 5 shows a possible variation for the contact head of the first embodiment.

As shown in the figure, the contact head according to this variation has a flange 19 (for example, a ring-shaped flange). This flange abuts against the lower face of the base part 7 when the contact head 17 is inserted in the through-hole 12 of this base part 7 in order to limit axial movement of the contact head 17 in the through-hole 12 and thus to avoid any excess pressure on the contact plate 2, which could lead to a deformation of the resin layer 14, in particular when the resin layer 14 is not fully hardened.

The use of a contact head 17 with a flange 19 may sufficiently reduce the risk of deformation of the resin layer 14 to make the use of the forming plate 18 unnecessary. However, the use of the flange 19 and forming plate 18 in conjunction may be preferable in some instances.

Figure 6:
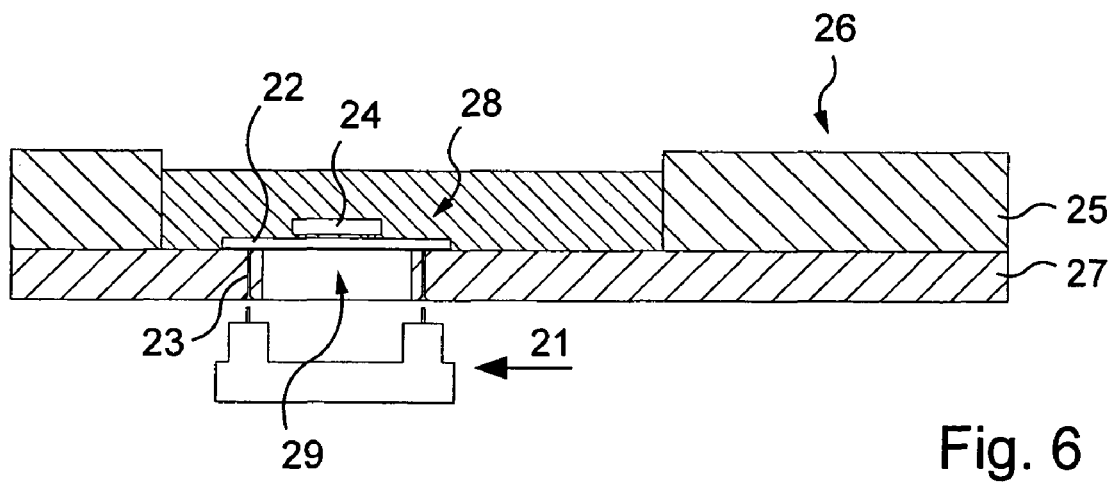
FIG. 6 shows a second embodiment of the invention.

FIG. 6 shows a second embodiment of the invention.

As in the first embodiment, an open mould 26 comprises a base part 27 with a through-hole 29 and a matrix 25 defining a cavity corresponding to the desired external shape of the microcircuit card.

In the step shown in FIG. 6, a resin layer 28 has been poured into the opening of the mould 26 and is at the hardening stage.

As in the first embodiment, a contact plate 22 carrying at least a microcircuit 24 is held against the bottom of the mould cavity by an appropriate securing means (for example by a suction means) at the level of the through-hole 29.

The surface of the contact plate 22 is however larger than the surface of the through-hole 29 so that the contact plate 22 extends laterally beyond the through-hole 29.

The base part 27 bears a plurality of conductors 23 (for example vias) in regions corresponding to the lateral extensions of the contact plate 22 over the through-hole 29, each conductor 23 corresponding to and in electrical contact with a contact on the contact plate 22.

Each conductor emerges from the bottom of the base part 27 in order to make electrical connection with a contact head 21 linked to the electrical personalisation equipment.

The conductors 23 extending through the base part 27 of the mould 26 therefore make it possible to electrically personalise the card while the resin layer 28 is still hardening by applying the contact head to the bottom of the mould 26.

It may be noted that the means for securing the contact plate 22 to the mould 26 (introduced in the through-hole 29) may be active during personalisation by the contact head 21. It may also be removed at the time of personalisation, in applications where the weight of the resin layer 28 exerts enough pressure on the top of contact plate 22 to ensure electrical contact between the contacts of the contact plate 22 and conductors 23.

Although in the embodiment shown in FIG. 6 the contact head 21 is moved into contact with the conductors 23 in the vicinity of the through-hole 29, the conductors 23 could also as a variant extend within the mould 26 (for example, along the base part 27) in such a manner that the contact head is brought into contact with the conductors 23 in another part of the mould.

As another variation, possibly combined with the preceding one, the contact plate 22 could be held within the cavity without the provision of a through-hole.

Figure 7:
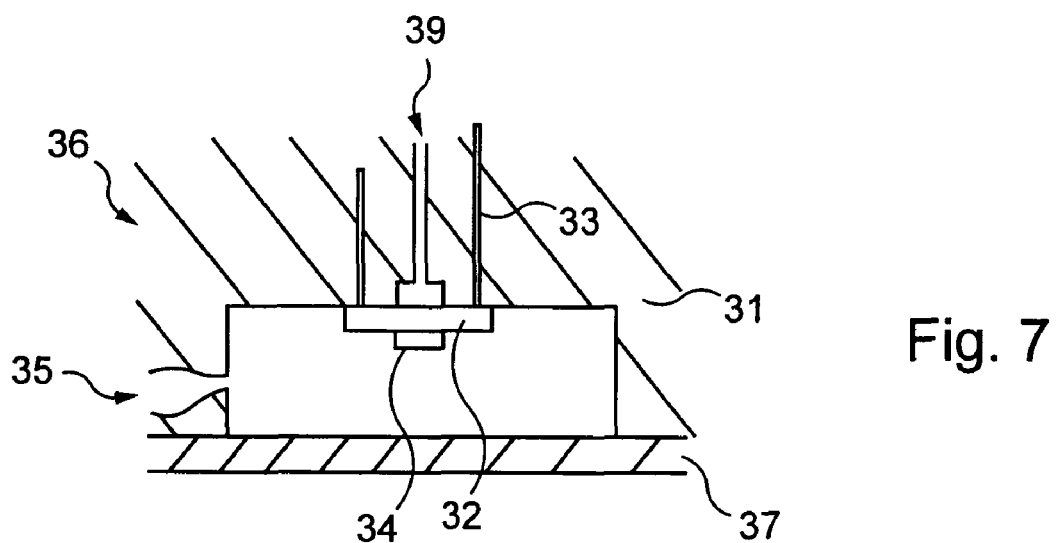
FIG. 7 shows a third embodiment of the invention.

FIG. 7 shows a third embodiment of the invention, wherein the mould 36 is a closed mould for injection moulding comprising conductors 33 as per the second embodiment.

The mould 36 comprises two parts 31, 37 defining a cavity where a plastic material is injected through an injection nozzle 35.

A low-pressure passage way 39 comes from the upper part 31 of the mould 36 into the cavity with an opening narrower than a contact plate 32 of the card to be manufactured.

The contact plate 32 carrying a microcircuit 34 is held against the upper hole of the cavity at its desired location relative to the card being manufactured, by reduced pressure in the passageway 39, provided, for example, by a pump In this position, a plurality of conductors 33 extending through the upper part 31 of the mould 36 allows the connection of a corresponding contact of the contact plate 32 with the personalisation equipment (not shown).

When the upper part 31 of the mould 36 is made from a conductive material, each of the conductors 33 is electrically insulated from the mould 36. The conductors 33 may, for example, be sheathed wires.

The construction just described makes it possible to electrically personalise the microcircuit card (i.e. storing data in a memory of the electronic module 32, 34) while the plastic material is being injected, or while the injected plastic material hardens (for example, as it cools down).

Figure 8:
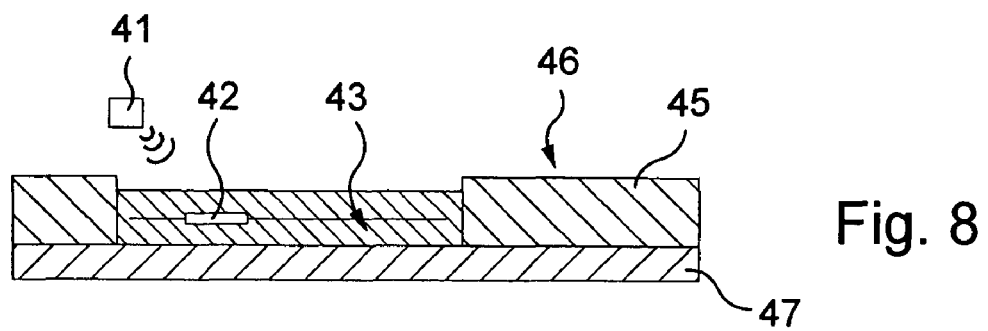
FIG. 8 shows a fourth embodiment of the invention.

FIG. 8 shows a fourth embodiment of the invention.

In this embodiment, a microcircuit card including a contactless module 42 is formed from an open mould 46 including a base part 47 and a matrix 45.

The contactless module 42 is connected to an antenna 43 forming an internal layer of the card and allowing contactless communication between the module 42 and an external communication apparatus 41.

Electrical personalisation of the card (i.e. the storing of data in a memory of the contactless module 42) can thus be achieved by contactless communication between the module 42 and a contactless head 41 connected to the personalisation equipment, while the microcircuit card is still within the mould 46 where it was formed, as shown in FIG. 8.

As shown in FIG. 8, the contactless head 41 is advantageously situated above the mould, thus facing an open side of the mould, which greatly eases communication between the contactless head 41 and the contactless module 42.

The preceding examples are just possible but non-limitative implementations of the invention. As already noted, the invention also applies to USB keys, in which case the personalisation may be performed for instance through the USB connector of the key while the key is in its forming mould. The electrical connection of the USB connector could at the same time provide at least a part of the mechanical connection between the connector and the mould. As a variation, the USB key could be personalised within the mould using contactless communication, as explained above in the case of a microcircuit card.

The invention claimed is:

1. A method of fabricating an electronic entity, comprising the steps of:
    forming at least part of the entity by hardening a material in a mold;
    personalizing the entity while in the mold, including electrically personalizing the entity by storing data in a memory of the electronic entity; and
    removing the personalized entity from the mold.

2. A method according to claim 1, wherein the step of personalizing occurs while the material is hardening.

3. A method according to claim 1, wherein the step of personalizing occurs while the material is flowing into the mold.

4. A method according to claim 1, wherein the step of personalizing includes forming a graphical representation on a face of the entity.

5. A method of fabricating an electronic entity, comprising the steps of:
    forming at least part of the entity by hardening a material in a mold; and
    personalizing the entity while in the mold, including storing data in a memory of the electronic entity,
    wherein a contact plate of the entity electrically linked to the memory is connected to a personalization equipment while the entity is in the mold.

6. A method according to claim 5, wherein a contact head connected to the personalization equipment is inserted in an opening of the mold for contacting the contact plate.

7. A method according to claim 5, wherein at least one conductor extending through the mold contacts the contact plate for connection to the personalization equipment.

8. A method of fabricating an electronic entity, comprising the steps of:
    forming at least part of the entity by hardening a material in a mold; and
    personalizing the entity while in the mold, including storing data in a memory of the electronic entity,
    wherein the step of personalizing includes exchanging said data through contactless communication between a microcircuit connected to the memory and a contactless head connected to the personalization equipment.

9. A method according to claim 1, wherein the mold is an open mold.

10. A method according to claim 9, wherein a forming plate is applied against said material in an open part of the mold.

11. A method according to claim 8, wherein the contactless head faces an open side of the mold, and the mold is an open mold.

12. A method according to claim 1, wherein the step of forming includes injection molding said part of the entity.

13. A method according to claim 1, wherein a plurality of entities are formed within said mold.

14. A method according to claim 13, wherein personalization of said entities is performed simultaneously.

15. A method according to claim 1, wherein the electronic entity is a USB key.

16. A method according to claim 1, wherein the electronic entity is a microcircuit card.

17. A method according to claim 16, wherein the microcircuit card is in conformity with ISO7816.

18. A device for fabricating an electronic entity, comprising:
    a mold for forming at least part of the entity by hardening a material; and
    means for personalizing the entity while in the mold,
    wherein the means for personalizing includes means for electrically personalizing the entity by storing data in a memory of the electronic entity.

19. A device according to claim 18, wherein the means for personalizing includes means for forming a graphical representation on a face of the entity.

20. A device for fabricating an electronic entity, comprising:
- a mold for forming at least part of the entity by hardening a material;
- means for connecting a contact plate of the entity electrically linked to the memory to a personalization equipment while the entity is in the mold; and
- means for personalizing the entity while in the mold,
- wherein the means for personalizing includes means for storing data in a memory of the electronic entity.

21. A device according to claim 20, wherein a contact head connected to the personalization equipment is adapted for insertion in an opening of the mold for contacting the contact plate.

22. A device according to claim 20, wherein at least one conductor extending through the mold is adapted to contact the contact plate for connection to the personalization equipment.

23. A device, for fabricating an electronic entity, comprising:
- a mold for forming at least part of the entity by hardening a material;
- means for personalizing the entity while in the mold,
- wherein the means for personalizing includes means for storing data in a memory of the electronic entity and means for exchanging said data through contactless communication between a microcircuit connected to the memory and a contactless head connected to the personalizing equipment.

24. A device according to claim 18, wherein the mold is an open mold.

25. A device according to claim 24, wherein a forming plate is applied against said material in an open part of the mold.

26. A device according to claim 23, wherein the contactless head faces an open side of the mold, and the mold is an open mold.

27. A device according to claim 18, wherein said mold is adapted to injection molding said part of the entity.

28. A device according to claim 18, wherein said mold is adapted to form a plurality of entities.

29. A device according to claim 28, including means for simultaneously personalizing said entities.

30. A device according to claim 18, wherein the electronic entity is a USB key.

31. A device according to claim 18, wherein the electronic entity is a microcircuit card.

32. A device according to claim 31, wherein the microcircuit card is in conformity with ISO7816.

33. A device according to claim 18, further comprising means for removing the personalized entity from the mold.

\* \* \* \* \*